July 31, 1956 — W. A. ANDERSON — 2,756,956
MOUNTING FOR CAMERAS AND THE LIKE
Filed Aug. 14, 1952 — 2 Sheets-Sheet 1
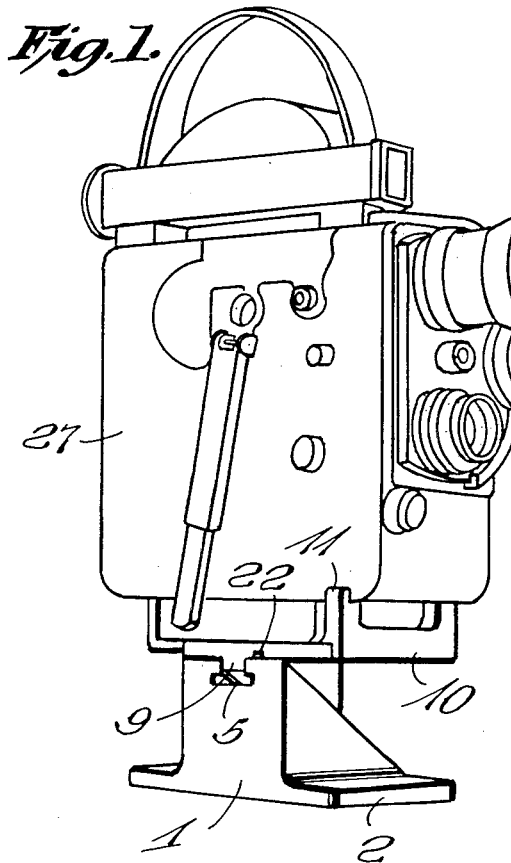
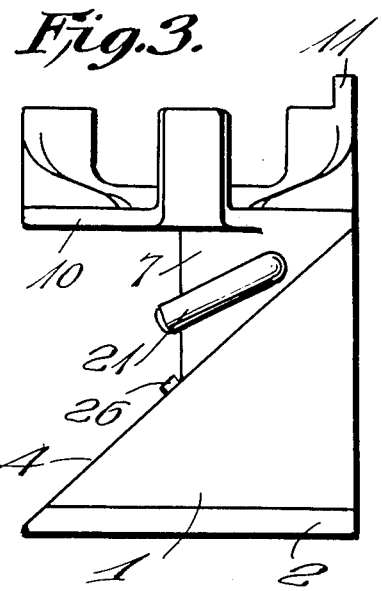
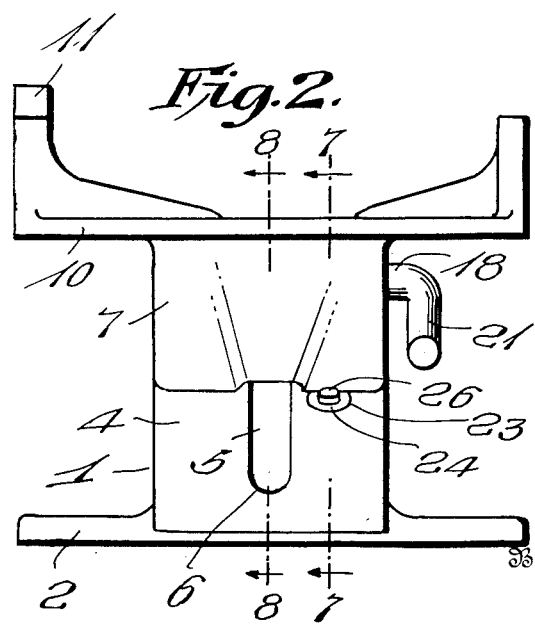
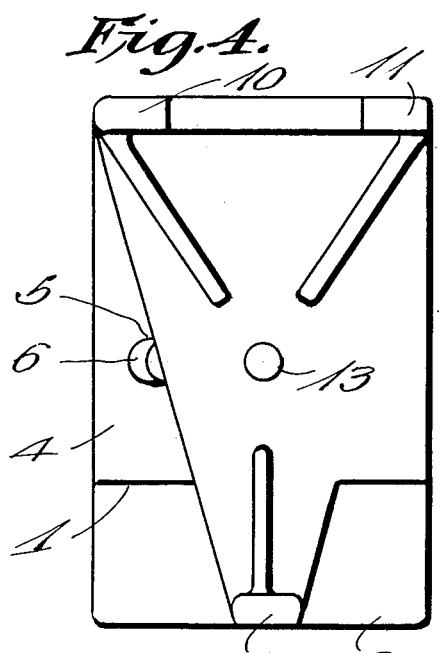
Inventor
William A. Anderson
By Lloyd W. Patch
Attorney

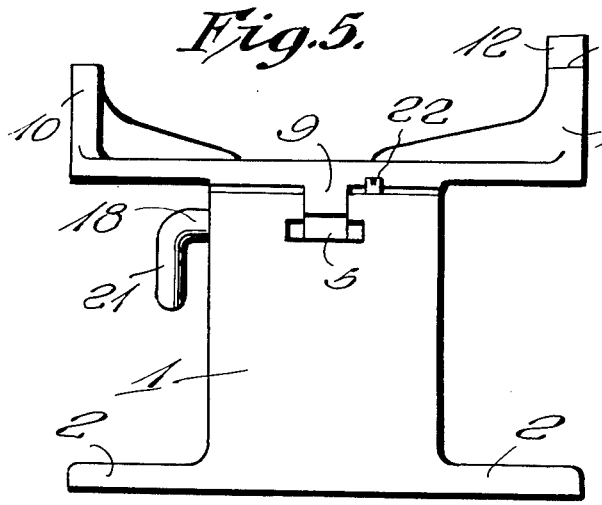
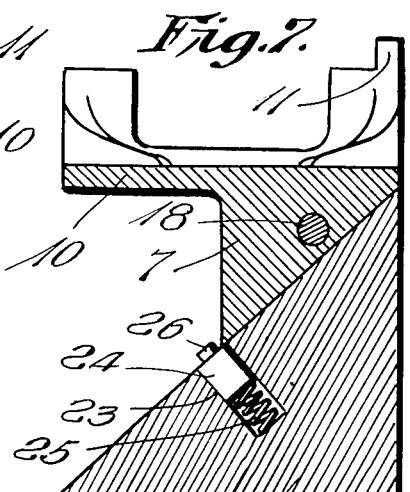
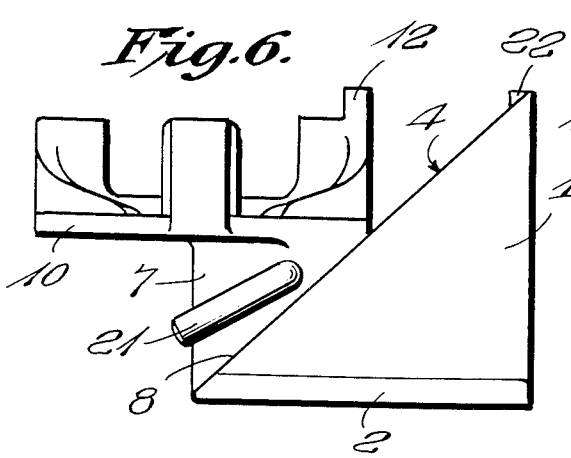
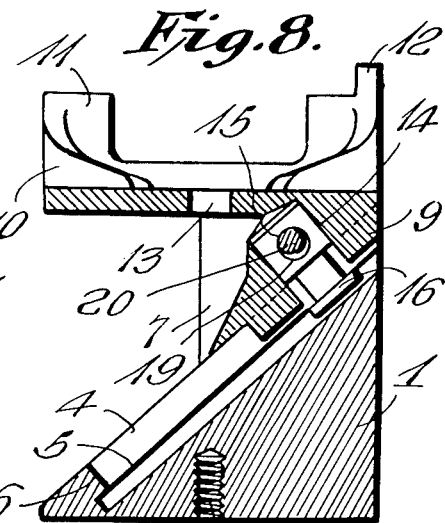
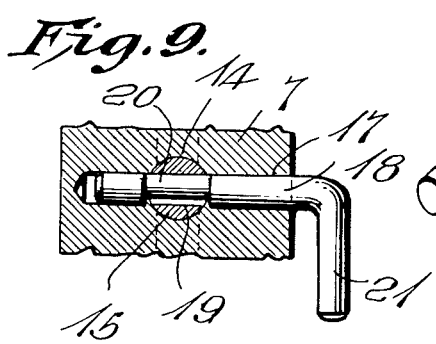
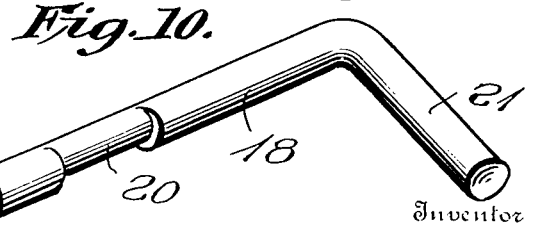

United States Patent Office 2,756,956
Patented July 31, 1956

---

2,756,956

MOUNTING FOR CAMERAS AND THE LIKE

William A. Anderson, Scranton, Pa.

Application August 14, 1952, Serial No. 304,373

1 Claim. (Cl. 248—178)

My invention relates to a mounting device for cameras and the like having picture taking and viewing structure requiring that the camera be moved or shifted from one position to another, for best results, with this shifting accomplished in a substantially oblique or diagonal direction from an upper position to a lower position offset laterally, and particularly to a device of this character which will permit the camera user to accomplish this movement without necessity of adjustments or variations in settings or calculations.

With several cameras now on the market the through-the-lens focusing position of the lens with respect to the body of the camera is different than the picture taking position of the lens, or the viewing mechanism is positioned in such relationship that the line of sight is different from the line of sight for taking a picture, and it is a purpose of my invention to provide a structure which can be employed to shift the camera to different positions as desired, and which will automatically accomplish and indicate the desired adjustment, and will then support and hold the camera substantially immovably.

A further object is to provide a device of this character which is of simple and inexpensive construction, and which guides movement in an oblique or angular path from one position to another, and then maintains the camera in the desired adjusted position.

My invention contemplates other objects and purposes, some of which will be set forth hereinafter and others of which will be apparent to those skilled in the art; and, the accompanying drawings illustrate an embodiment of the invention.

In the drawings:

Figure 1 is a view in perspective showing an embodiment of my invention having a camera fitted therewith, and showing the adjustment of the parts with the camera in picture taking position.

Fig. 2 is a view in side elevation of the supporting structure.

Fig. 3 is a view in end elevation.

Fig. 4 is a top plan view.

Fig. 5 is a view in side elevation showing the side opposite to that illustrated in Fig. 2.

Fig. 6 is a view similar to Fig. 3 showing the parts in an opposite adjusted position.

Fig. 7 is a transverse sectional view substantially on line 7—7 of Fig. 2.

Fig. 8 is a transverse sectional view on line 8—8 of Fig. 2.

Fig. 9 is a fragmentary sectional view showing the locking means.

Fig. 10 is a perspective view showing the locking cam member.

A supporting or base member 1, which can be of metal or other suitable material, has a base flange structure 2 thereon adaptable to hold the supporting member 1 in upright relation when placed upon a table or other flat support. The base member 1 is also provided with a threaded opening 3 adapted to receive a clamping screw of a tripod or other support on which it may be desired to mount the camera.

The upper oblique face 4 of the supporting base member is made on a diagonal or oblique angle corresponding to the vertical or lateral offset or movement required in the adjustment of the camera from one position of use to another, and this diagonal or oblique face is provided with a T-shaped trackway 5 which extends substantially across the oblique face from the upper end to the closed end 6 of this trackway 5 which is adjacent to the lower edge of the face.

A camera supporting member 7 has a base portion which on its under side is provided with an oblique or diagonal face 8 movable on and corresponding substantially to the angle of the face 4.

An elongated guide rib 9 is provided on the lower side of face 8 near the upper edge thereof and is made of a dimension to fit and slide within the trackway 5 so that sliding movement of the member 7 will be guided along the oblique or diagonal face 4 of the supporting member 1.

On its upper portion, the camera supporting member 7 is provided with supporting arms or brackets 10 which are shaped or formed to receive and support a camera on their upper faces 11. It is preferable that the upper portions at 11 be made to receive a camera and to position the camera in the desired relationship with the picture viewing and picture taking axis substantially parallel with the face 4, and that provision be made for retaining the camera against lateral twisting, this being accomplished in the present instance by providing a camera positioning lug 12.

It is requisite that the camera be held in substantially rigid mounting on the supporting member 7, and this can be accomplished by use of a mounting screw passed through opening 13 in the camera supporting member and screwed into the usual tripod screw opening of the camera.

As stated, the camera supporting member 7 is slidably movable along the oblique face 4 of the supporting or base member 1, and the elongated guide rib 9 will assure the desired movement and alignment of the member 7 with respect to the member 1.

It is desirable that in the picture taking position of adjustment the camera supporting member be substantially rigidly locked to and held in conjunction with the supporting member, and with this in mind I provide a bearing opening 14 in the supporting member 7 and extending through the elongated guide rib 9. This bearing opening 14 is preferably at right angles to the diagonal face 8, and is centered with respect to the elongated rib 9. A locking member 15 is fitted slidably in the bearing opening 14, and is provided with a locking head 16 which extends laterally out beyond the sides of the elongated guide rib 9 into position to engage beneath the T-shaped trackway on each side. Thus, as the locking member or bolt is moved outwardly, the head portion 16 will be clamped in the trackway to lock the camera supporting member substantially rigidly in conjunction with the supporting or base member 1.

To accomplish this tightening of the lock member or bolt 15, I provide a second bearing opening 17 through the camera supporting member 7 crossing the first bearing opening 14, and in this opening rotatably mount a manually actuatable locking rod 18. The locking bolt 15 is provided with a cam bearing opening 19 aligned with the second bearing opening 17, and the locking rod 18 has a cam portion 20 thereon received in this cam bearing opening 19. An operating handle 21 extends laterally at one end of the locking rod 18, by which said rod can be rotated.

By making the parts in this manner, the locking bolt 15 can be fitted in place and the locking rod 18 can then be inserted endwise through the second bearing opening 17 and passed through the cam bearing opening 19. In most positions of the locking rod 18, the shoulders at opposite ends of the cam 20, formed by reducing the rod 18 eccentrically will be in position to guard against accidental or casual withdrawal of the locking rod from the second bearing opening 17, and the parts are thus readily assembled and are maintained in assembled relationship.

When the handle 21 is swung to move the cam 20 to the position disclosed in Fig. 8, the locking bolt 15 will have its head 16 drawn against the side flanges of the T-shaped slot or trackway 5, and the camera supporting member 7 will be rigidly held in conjunction with the supporting or base member 1; and, when the handle 21 is manually manipulated to turn the cam 20 to an opposite position the locking bolt 15 will be released for allowing free adjusting movement of the camera supporting member from one position to another.

It is desirable that means be provided for limiting upward movement of the member 7 along the oblique face 4 of supporting member 1, and with this in mind I provide a stop screw 22 turned into a suitably threaded opening in the face 4 of the member 1. By removing this screw 22 the parts can be readily assembled or disassembled, and when the screw is in place there is an upper limit of movement of the member 7 to the position shown in Figure 1.

When the locking bolt is released, the camera supporting member 7 can be moved downwardly along the oblique face 4 to the position shown in Fig. 6, and the elongated guide rib 9 will contact with the end 6 to limit and stop movement in the lowermost position.

It is desirable that means be provided to automatically hold the member 7 in the uppermost position, and this can be accomplished as shown in Fig. 7, where a bore opening 23 is provided in the member 1 at substantially the lower edge of the bearing face 8 of member 7 when in the upper position. A spring bolt 24 is slidably fitted in this bore 23, with a coil spring 25 bearing resiliently against the inner end thereof, and the spring bolt 24 has a stop pin 26 on the outer end thereof which will engage the lower edge of the member 7 when this camera supporting member is in the uppermost position. Due to the fact that the stop pin 26 is of reduced size, the lower edge of member 7 will extend to prevent displacement of spring bolt 24; and, when it is desired to move the camera supporting member 7 to its lowermost position, pressure can be exerted against the stop pin 26 to displace spring bolt 24 inwardly, and member 7 is then freely movable downwardly.

With the structure as set forth, the supporting or base member 1 can be placed upon a table or mounted upon a tripod or supported in any other desired manner, and a camera as generally indicated at 27 can be mounted on the camera supporting member 7. By manipulation of the parts, the member 7 can be moved upwardly and downwardly and laterally along its oblique face 8 bearing on the oblique face 4, and adjustments can be readily made to the upper and lower positions desired for use of the camera. The guide rib 9 will assure that such movement will be at right angles to the picture taking and focusing axis of the camera, and when the supporting member 7 is adjusted to the upper and the lower positions movement thereof will be stopped. By the locking bolt and operating means therefore, the camera supporting member 7 can be substantially rigidly locked and held in connection with the supporting member 1.

While I have here shown and described only certain specific embodiments of my invention and have suggested only certain possible uses, it will be appreciated that changes and variations can be made, without departing from the spirit and scope of my invention as set forth in the claim.

I claim:

An adjustable mounting device for cameras and the like having picture taking and viewing means requiring vertical and lateral adjustments in substantially oblique direction for movement of the camera to two different positions, comprising a base member having an oblique face disposed at an angle corresponding to the direction of movement required in adjusting the camera from one position to another, a T-shaped trackway extending along said diagonal face, a camera supporting member having a diagonal face corresponding to and fitting the diagonal face of the base member, an elongated guide on the camera supporting member slidably received in the trackway of the supporting member, said camera supporting member being provided with a bearing opening extending through the elongated guide and having a second bearing opening extending substantially at right angles with respect to said first opening, a T-shaped member fitted slidably in said first bearing opening and provided with a bearing opening transversely therethrough substantially in alignment with the second bearing opening, a cam operated locking member fitted endwise through said second bearing opening and having a cam portion within the T-shaped member, and a laterally extending handle on said locking member by which said locking member is located to bring the cam into operation.

References Cited in the file of this patent

UNITED STATES PATENTS

| 780,979 | Correll | Jan. 31, 1905 |
| 1,092,867 | Sellew | Apr. 14, 1914 |
| 1,820,305 | Farmer | Aug. 25, 1931 |
| 2,351,386 | Zucker | June 13, 1944 |
| 2,375,690 | Reeves | May 8, 1945 |
| 2,624,252 | Judd | Jan. 6, 1953 |

FOREIGN PATENTS

| 50,337 | France | Mar. 16, 1940 |
| | (1st addition to No. 821,929) | |
| 360,777 | Great Britain | Nov. 12, 1931 |
| 569,599 | Great Britain | of 1945 |
| 606,803 | Germany | Dec. 11, 1934 |